(12) United States Patent
Rautiola et al.

(10) Patent No.: US 9,084,032 B2
(45) Date of Patent: Jul. 14, 2015

(54) CONVERT IP TELEPHONY NETWORK INTO A MOBILE CORE NETWORK

(75) Inventors: Markku Rautiola, Tampere (FI); Heikki Oukka, Kempele (FI)

(73) Assignee: Intermec IP Corp., Fort Mill, SC (US)

( * ) Notice: Subject to any disclaimer, the term of this patent is extended or adjusted under 35 U.S.C. 154(b) by 1460 days.

(21) Appl. No.: 12/161,288

(22) PCT Filed: Jan. 18, 2007

(86) PCT No.: PCT/FI2007/050025
§ 371 (c)(1),
(2), (4) Date: Jun. 23, 2010

(87) PCT Pub. No.: WO2007/085690
PCT Pub. Date: Aug. 2, 2007

(65) Prior Publication Data
US 2010/0265880 A1 Oct. 21, 2010

(30) Foreign Application Priority Data
Jan. 19, 2006 (FI) ....................................... 20060045

(51) Int. Cl.
*H04W 4/00* (2009.01)
*H04Q 3/00* (2006.01)
(Continued)

(52) U.S. Cl.
CPC ........ *H04Q 3/0025* (2013.01); *H04L 29/12311* (2013.01); *H04L 29/12783* (2013.01); *H04L 29/12801* (2013.01); *H04L 61/2084* (2013.01); *H04L 61/35* (2013.01); *H04L 61/6004* (2013.01); *H04L 65/104* (2013.01); *H04L 65/1016* (2013.01); *H04L 65/1073* (2013.01)

(58) Field of Classification Search
None
See application file for complete search history.

(56) References Cited

U.S. PATENT DOCUMENTS 6,731,621 B1 * 5/2004 Mizutani et al. .............. 370/338
7,305,230 B2 * 12/2007 Zhigang ..................... 455/414.1
(Continued)

FOREIGN PATENT DOCUMENTS

WO 03001836 A1 1/2003
WO 2005025196 A1 3/2005
(Continued)

OTHER PUBLICATIONS

International Search Reports dated Dec. 19, 2006 and Nov. 20, 2007.
(Continued)

*Primary Examiner* — Rhonda Murphy
(74) *Attorney, Agent, or Firm* — Additon, Higgins & Pendleton, P.A.

(57) ABSTRACT

A system includes a terminal, a wireless access network, an IP telephony network, a core network gateway from the IP telephony network to the public mobile phone network and a network device, which connects the wireless access network to the IP telephony network and adapts the IP telephony network services to be used by utilizing the circuit-switched signaling protocols of the terminal. A location updating request is received from the terminal over the wireless access network. Location updating is performed via a core network gateway. The network device performs user registration to the IP telephony network using a domain name formed by the phone number of the user and the domain name of the network device or the numeric IP address as the address connection to be registered and as location data in the IP telephony network.

17 Claims, 2 Drawing Sheets

(51) Int. Cl.
*H04L 29/12* (2006.01)
*H04L 29/06* (2006.01)

(56) References Cited

U.S. PATENT DOCUMENTS

| | | |
|---|---|---|
| 2002/0024943 A1 | 2/2002 | Karaul et al. |
| 2003/0026245 A1 | 2/2003 | Ejzak |
| 2003/0027569 A1 | 2/2003 | Ejzak |
| 2003/0027595 A1 | 2/2003 | Ejzak |
| 2003/0134638 A1 | 7/2003 | Sundar et al. |

FOREIGN PATENT DOCUMENTS

| | | |
|---|---|---|
| WO | 2005039132 A1 | 4/2005 |
| WO | 2007082551 A1 | 7/2007 |

OTHER PUBLICATIONS

European Search Report dated Jan. 7, 2011.

"Digital cellular telecommunications system (phase 2+); Universal Mobile Telecommunications System (UMTS); Numbering, addressing and identification (3GPP TS 23.003 version 6.8.0 Release 6); ETSI TS 123 003" ETSI Standards, LIS, Sophia Antipolis Cedex France, vol. 3-CN2;3-CN4, No. V6.8.0, Sep. 1, 2005 (Sep. 1, 2005), XP014032421, ISSN: 0000-0001 paragraph [13.1] —paragraph [13.2] p. 46-p. 47.

3GPP SA WG2: "Combining Circuit Switched (CS) and IP Multimedia Subsystem (IMS) services; Stage 2 V7.1.0 (Release 7)", Internet Citation, Dec. 2005), XP002398014, Retrieved from the Internet: URL: http://www.3gpp.org/ftp/Specs/html-info/23279.htm [retrieved on Sep. 7, 2006] the whole document.

* cited by examiner

CONVERT IP TELEPHONY NETWORK INTO A MOBILE CORE NETWORK

CROSS REFERENCE TO RELATED APPLICATIONS

This application is the National Stage of International Application No. PCT/FI2007/050025, International Filing Date, 18 Jan. 2007, which designated the United States of America, and which International Application was published under PCT Article 21 (2) as WO Publication No. WO2007/085690 and which claims priority from Finnish Application No. 20060045, filed on 19 Jan. 2006, the disclosures of which are incorporated herein by reference in their entireties.

FIELD

The disclosed embodiments relate to a system and a method for converting a generic IP telephony network to operate as a public mobile core network when a circuit-switched wireless access network is connected to it with a multi-radio protocol gateway (MRGW) according to the disclosed embodiments.

BACKGROUND

As the wireless access network it is possible to use radio networks of public mobile phone systems, such as, for example, GSM, IS-54, IS-95, CDMA-2000 and WCDMA radio networks, as well as radio networks using unlicensed radio frequencies, such as, for example, a wireless local area network in its different forms (for example different versions of IEEE 802.11) and Bluetooth networks. The access networks can be used in both a circuit-switched mode (radio networks of public mobile phone systems) and a packet-switched mode (radio networks using unlicensed radio frequencies) for circuit-switched services (reference: UMA). UMA (Unlicensed Mobile Access) refers to a manner specified by the UMA consortium for relaying the circuit-switched signaling protocols of a public mobile phone system over a TCP/IP connection by utilizing, for example, any unlicensed radio frequency. The generic IP telephony network can be a system according to IETF (Internet Engineering Task Force) specifications or a proprietary system, such as Skype.

The employees of a company use and want to use mobile phones and other portable communication means increasingly in their daily communication with clients, cooperation partners, other employees of the company, etc. The single greatest hindrance or even an obstacle for the increasing use of devices and services is the poor predictability and control of costs connected to wireless services. The situation differs from country to country and, for example, depending on the size and location of the company; the best situation is in small companies, which operate in one country and whose communication needs are very close to those of ordinary consumers, the poorest situations, in turn, is in large, multinational companies, which operate in several countries and a part of whose traffic is directed internationally. There have been attempts, and still are, to solve this problem by different, mainly operator-provided wireless business solutions, which are based on, for example, detailed numbering and special pricing. These solutions are used to some extend, but it is very common, especially in larger companies to continue to use two, these days even three overlapping systems and services to implement, for example, voice services. These overlapping systems implementing voice services are a conventional switchboard with subscriber lines, a public mobile phone network, as well as an IP telephony network functioning in the company intranet.

The above-presented overlapping of systems and services creates additional costs and has created a service environment, where it is very difficult, almost impossible in practice, for especially large companies to have an operating environment that has easily predictable and controllable operation costs. Companies are very well aware of this and because of this, companies have started to rationalize the systems and services they use, for example, by replacing conventional switchboards with IP telephony systems in the intranet. IP telephony systems convert the telephone service into one intranet application, which can be used and controlled with the same mechanisms as any intranet application. Cost savings can now be created by abandoning a switchboard and a switchboard network. The cost savings reached by this, however, depend on how many additional investments must be made in the intranet. In practice, it has also been noticed that cost savings alone are not enough to justify implementation of IP telephony systems, but there must be other advantages as well. At the same time company employees want to, however, use mobile phones and other wireless terminals more and more to facilitate and boost their communication readiness and through that to make their daily work more effective.

Large Internet portals, such as Skype, Yahoo, Google, MSN and AOL have expanded and are expanding their services to cover voice services as well, primarily due to the success and popularity of Skype. At the same time the so-called low-cost operators have expanded and are expanding wider by offering cheap mobile phone services with their own brands by utilizing the systems and services of actual mobile phone operators. Large Internet portals and low-cost operators are very similar in their business model, operation modes, organization, etc., i.e. they implement a so-called "best price" strategy, they do not have their own, conventional telephone network, they have very light and relatively small organizations, most support services are outsourced, etc. The obvious next step in the service development of large Internet portals is becoming global low-cost operators by offering mobile phone services as part of their service selection as well. Other low-cost operators will compete with large Internet portals for the same customers, but the advantages of large Internet portals in this competition are globality, the ability to reach the large mass markets of the Internet community fast, a very large existing customer and user base, and a very well known brand name.

In the business world and in the low-cost operator market the disclosed embodiments now help the rationalization of operation costs and implementation of the "best price" strategy by converting the existing IP telephony network into a public mobile core network in such a manner that the services of the mobile core network are implemented with the IP telephony network services without having to make changes to the IP telephony network itself. The conversion is implemented with a multi-radio protocol gateway according to the disclosed embodiments, which are connected between the IP telephony network and a radio network of a public mobile phone system in such a manner that the multi-radio protocol gateway adapts the connection protocols of the mobile core network to the connection protocols of the IP telephony network. The connection protocol adaptations are made for the telephone services and the additional services connected to them. The services of a mobile core network implemented with an IP telephony network can now be used directly over a circuit-switched radio network of a mobile phone system, as well as over a packet-switched radio network utilizing unlicensed radio frequencies by using circuit-switched connection protocols, in which case the operation costs can be further rationalized.

Publications US 2003/0027569 A1, US 2003/0027595 A1 and US 2003/0026245 A1 disclose a system and a new entity (iMSC), by means of which the circuit-switched services of a public mobile core network can be implemented in the IP Multimedia Subsystem (IMS) specified by the 3GPP ($3^{rd}$ Generation Partnership Project). The publications disclose a new entity called iMSC, which converts the circuit-switched location updating and the voice service and feature control into SIP operations according to an IP multimedia subsystem. The publications do not directly describe how the conversion is performed, but they refer to known operation modes of a public mobile phone network and to the known operations of the elements of a public mobile phone system.

For example, the publications disclose that the iMSC performs registration of the user equipment (UE) in the IP multimedia subsystem, but they do not disclose which public user identity the iMSC registers in the IP multimedia subsystem for the user equipment nor which address said public user identity is connected to by means of the address connection being registered. In accordance with the recommendations of the IP multimedia subsystem of 3GPP—to which the publications refer—there may be several registered public user identities and they may be in the form of a SIP resource identifier (SIP URI, Uniform Resource Identifier) or a uniform resource locator meant for a telephone number.

The above-mentioned public user identities are stored in an IP-multimedia-subsystem-specific subscriber identity module (SIM) card. If no public user identities are specified, one public user identity is derived according to the 3GPP recommendations from the International Mobile Subscriber Identity (IMSI) of the user, which is then registered in the IP multimedia subsystem. IMSI specifies the subscriber connection unambiguously, but IMSI is not a telephone number with which or to which it is possible to call from a conventional mobile phone or telephone network, and not necessarily even within the IP multimedia subsystem. In generic IP telephony networks the spectrum of public user identities is even wider, when proprietary systems, such as Skype, are also taken into account.

If now a mobile phone number is registered in the IP multimedia subsystem as the user's public address and the domain name of the iMSC as the address connection, as a person skilled in the art can assume from the operational descriptions of the publications in question and on the basis of the recommendations of 3GPP and IETF—and which is an absolute condition for the solution disclosed in the publications to even function—it still remains unclear how the address connection registered for the user is provided to the ENUM/DNS service. It is not specified in the recommendations of 3GPP or IETF either.

For the part of call control the operation of the conversion is described in FIG. 3 of the publications, where the operation of iMSC is described by two known elements 'MSC Server' and 'P-CSCF'. A person skilled in the art can on the basis of the publications assume that reference is made to elements specified in the 3GPP recommendations and their operation, in which case it remains unclear how the conversion is made, because neither of the above-mentioned elements supports the conversion of call control signaling in any way as such, and in the publications in question the way the conversion is made is not specified as a new operation for said elements. Elsewhere in the publications it is disclosed that the iMSC behaves like a combination of a SIP User Agent, (SIP UA) and 'P-CSCF'. Further, a person skilled in the art can on the basis of the publications assume that reference is made to elements specified in the 3GPP recommendations and their operation, in which case it remains unclear how, for example, the conversion of a call control signaling is made, because neither of the above-mentioned elements supports the conversion of call control signaling in any way as such according to the 3GPP recommendations, and in the publications in question the way the conversion is made is not specified as a new operation for said elements.

For the part of call control signaling a more operative combination would be, according to the 3GPP recommendations and imitating the publications in question, for example a combination of 'MSCServer'-'T-SGW'-'MGCF'-'B-CSCF' or 'MSC Server'-'T-SGW'-'MGCF'. The same applies for the conversion of circuit-switched supplementary services. For the part of SIP registration the above-mentioned combination of the SIP user agent and 'P-CSCF' would be more operative from the point of view of the SIP connection procedure, if the interface between iMSC and the 'C-CSCF' entity mentioned in the publications would, in accordance with the 3GPP recommendations, be Gm. The interface between iMSC and the 'C-CSCF' entity is now specified by a new interface 'Mx'. In the publications the interface is specified as an interface using the SIP connection procedure according to the procedures of the IP multimedia subsystem, there are no other specifications for it and in the 3GPP recommendations the interface in question does not exist. In addition, the SIP user agent and 'P-CSCF' do not as such support the conversion of the location updating signaling in any way according to the 3GPP recommendations.

Further, in connection with the location updating of the mobile phone network and registration to the IP multimedia subsystem, FIG. 4 of the publications shows that the location updating to the mobile phone network is performed first and then the registration to the IP multimedia subsystem. This may lead to an unfortunate situation for the user: if the location updating to the mobile phone network is now successful, but registration to the IP multimedia subsystem fails, the result is a situation where no calls can be made with the terminal in question and no calls are received in it, because the user in question has not registered to a core network, i.e. the IP multimedia subsystem. The situation cannot be rectified until the terminal performs a periodic location updating or the user switches the terminal off and on again, in which case the registration to the IP multimedia subsystem is attempted again. In paragraph [0059] of the publication US 2003/0026245 A1, is mentioned the procedure 'inter-iMSC Location Update' of the 3GPP recommendation TS 24.008, which, however, is not specified in the recommendation in question, nor is, for example, the 'inter-MSC Location Update' procedure. The same procedure is mentioned in the other above-listed publications as well.

The publication mentions the iMSC entity performs the authentication of the user, for example paragraphs [0057] and [0059] of US 2003/0026245 A1, which on the basis of the description in the publication is an authentication based specifically on the procedures of a conventional mobile phone network, i.e. authentication performed by the visitor location register VLR on the basis of authentication parameters received from the home location register HLR over the MAP interface, and not an authentication performed by an IP multimedia subsystem. This assumption is also supported by the description of the operation in paragraph of US 200370026245 A1 (which description of operation can be found in the other publications as well): the iMSC entity sends an SIP registration request to the 'CSCF' (first to 'I-CSCF', which sends the request further to 'S-CSCF'), after which the 'CSCF's should perform authentication of the terminal through the iMSC entity by using the SIP authentication procedure of the IP multimedia subsystem and only then bring the SIP registration to a finish with 'HSS'.

SUMMARY

The disclosed embodiments make it possible to implement, for example, a conventional switchboard of a company as a wireless solution by utilizing an existing IP telephony network and by using, for example, ordinary GSM phones to replace the subscriber lines of a conventional switchboard. The disclosed embodiments also make it possible to implement, for example, a Skype network as a wireless solution by also utilizing ordinary GSM phones as such as Skype phones without having to download a specific Skype client software or the like into the GSM phone.

By means of the disclosed embodiments, for example, service providers producing telecommunication services for companies, as well as large Internet portals as service providers can now become virtual mobile phone network operators by combining their existing telecommunication networks and the radio networks of a public mobile phone system to each other and by providing their customers with mobile phone services on the coverage area of the radio networks connected to their telecommunication networks. These service providers can now utilize the subscriber cards (i.e. SIM cards) of the mobile phone network operators owning the radio networks in order to control access to their telecommunication networks and the use of their services. The service providers can also use their own SIM cards and when using unlicensed radio frequencies the service providers may become real mobile phone network operators without them having to acquire a frequency license or to create an expensive national radio network.

DETAILED DESCRIPTION OF THE DRAWINGS

The more specific structure and operation of the overall system utilizing the disclosed embodiments are described for the part of the public mobile phone system with terms, interfaces and protocols known from GSM and UMTS. For the part of the generic IP telephony system the operation is described with terms, interfaces and protocols specified by IETF.

Figure 1:
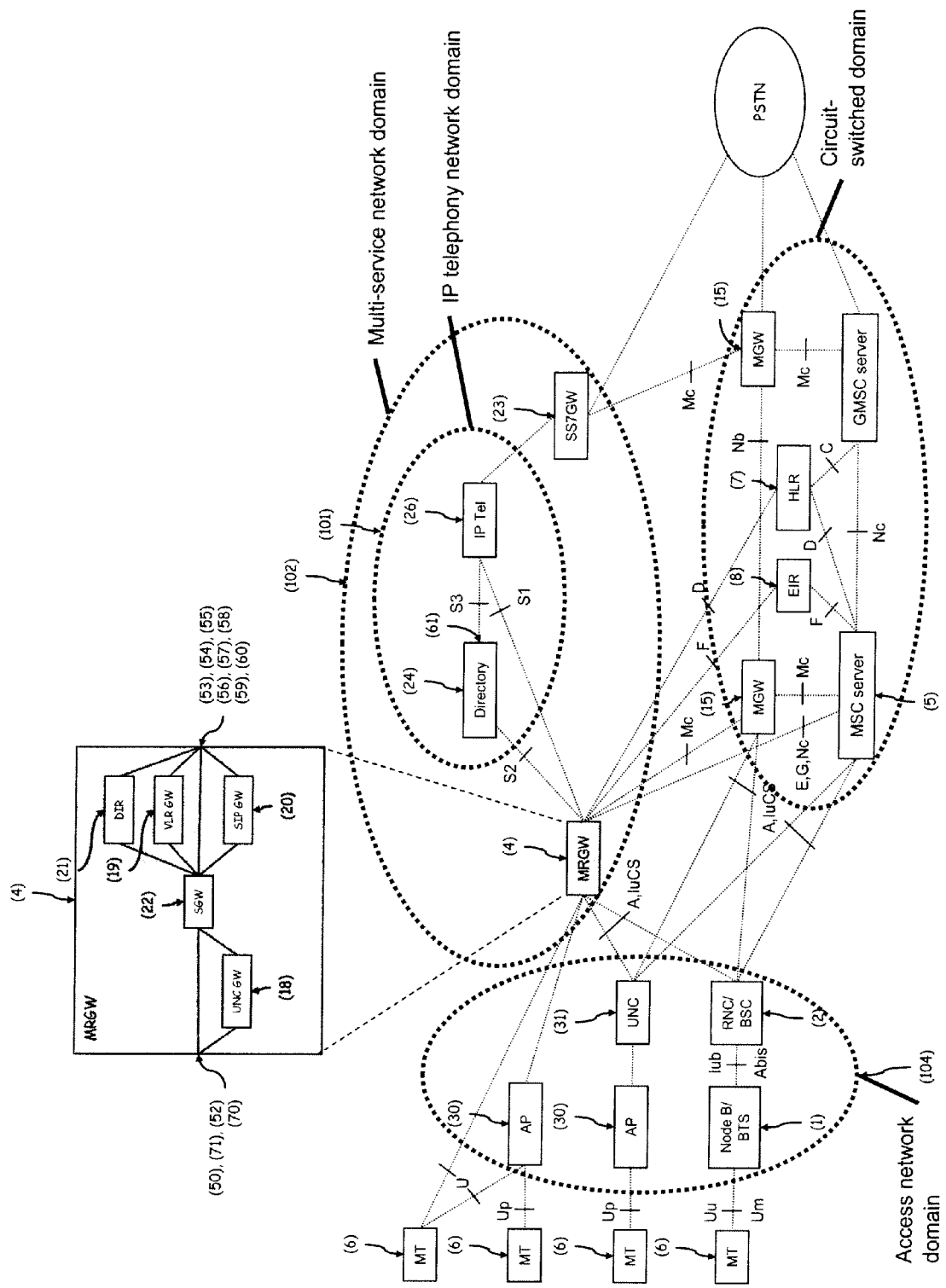
FIG. 1 shows an operational block diagram of an overall system utilizing the disclosed embodiments.

In the overall system according to FIG. 1, the circuit-switched wireless access network domain (104) of a public mobile phone system is connected to a multi-service network domain (102) formed by an IP telephony network domain (101) and the multi-radio protocol gateway (4) according to the disclosed embodiments via the multi-radio protocol gateway (4) according to the disclosed embodiments. The circuit-switched wireless access network (104) is formed by a base station (1) as well as a base station/radio network controller (2), which is called a Base Station Subsystem (BSS) in the GSM system and a Radio Network System (RNS) in the third generation UMTS system. The circuit-switched wireless access network (104) can also be formed by, for example, an UMA network utilizing unlicensed frequencies, which network contains wireless radio access points (AP) (30) as well as an UMA network controller (31), or it can be formed of a generic access network utilizing unlicensed frequencies, which is composed of only wireless access points (30). A mobile services switching center/visitor location register server (MSC Server) (5), a home location register (HLR) (7) as well as an equipment identity register (EIR) (8), in turn, form the mobile core network. The mobile cores network is divided into a circuit-switched part, which comprises the MSC Server (5) (this may naturally also be a conventional combination of a mobile services switching center and a visitor location register), and a location register part, which comprises the home location register (7) and the visitor location register (not shown separately in FIG. 1).

Next, the interfaces of a core network based on the IP telephony system (101) utilizing the multi-radio protocol gateway will be described more in detail. The interfaces are described divided into a circuit-switched part and a register part according to the parts of the public mobile core network. In addition, the interfaces are described seen from the point of view of a generic IP telephony system.

When the wireless access network (104) of the public mobile phone system of FIG. 1 is connected via an interface A (50) or IuCS (71) to a multi-radio protocol gateway (4), the wireless access network (104) sees the multi-radio protocol gateway (1) and the IP telephony system (101) behind it as an MSC Server (5) of the public mobile phone system, i.e. as a circuit-switched part of the public mobile core network. It should be noted that, for example, the interface (50) can be either a real GSM A interface, or it can be a distributed A interface in such a manner that the lower protocols of the A interface (for example, MTP and SCCP protocols) are implemented with an SS7oIP gateway utilizing the known 'SS7 over IP' gateway technique (not shown in FIG. 1) and the upper protocols of the A interface (for example BSSMAP and DTAP protocols) in the multi-radio protocol gateway (4), which also supports the above-mentioned 'SS7 over IP' gateway technique. If the base station/radio network controller (2) of the wireless access network (104) also supports the above-mentioned 'SS7 over IP' gateway technique, said SS7oIP gateway is not needed in the interfaces A (50) and IuCS (71). Said 'SS7 over IP' gateway technique is a method specified by IETF, including protocols (i.e. Sigtran protocols), for transferring SS7 signaling by utilizing the IP connection protocol. Via the interface Up (52) the terminal (6) sees the multi-radio protocol gateway (4) and the IP telephony system (101) behind it as an UMA network controller and as an MSC Server (5) of a public mobile phone system, i.e. as a circuit-switched part of the mobile core network. Via the interface Up (70) the terminal (6) sees the multi-radio protocol gateway (4) and the IP telephony system (101) behind it as an MSC Server (5) of a public mobile phone system over a TCP/IP (or the like) connection when the terminal (6) performs location updating to a public mobile phone system. It is to be noted that in this case the terminal (6) must have adequate properties to activate and perform the location updating procedure to the mobile phone system over, for example, the above-mentioned TCP/IP (or the like) connection. It is also to be noted that in this case the terminal (6) can be connected to the multi-radio protocol gateway (4) over a fixed ('wired') connection as well, for example, in the case that the terminal (6) is a computer with a SIM card of a public mobile phone system or a corresponding functionality to perform the location updating procedure.

Via the interface E (53) of FIG. 1 the MSC Server (5) of the public mobile phone system sees the multi-radio protocol gateway (4) and the IP telephony system (101) behind it as an MSC Server (5) of the public mobile phone system when the ongoing call must be transferred from a public mobile phone system to a IP telephony system (101) or vice versa without interrupting the call (handover). Via the interface G (54) the MSC Server (5) of the public mobile phone system sees the multi-radio protocol gateway (4) and the IP telephony system (101) behind it as a visitor location register of a public mobile phone system when the terminal (6) performs location updating when transferring from one visitor location register to another. Via the interface D (55) the home location register (7) of the public mobile phone system sees the multi-radio protocol gateway (4) and the IP telephony system (101) behind it as the visitor location register of the public mobile phone system when the terminal (6) performs location updating when transferring from the area of one visitor location register to another, or when a call from the public mobile phone system is relayed to the terminal (6), or when the terminal (6) requests a call relay to A public mobile phone network, or when subscriber data is changed and the changed data is transferred between the home location register (7) and the multi-radio protocol gateway (4) and the IP telephony system behind it. Via the interface F (56) the equipment identity register (8) of the public mobile phone system sees the multi-radio protocol gateway (4) and the IP telephony system (101) behind it as an MSC Server (5) of the public mobile phone system when the equipment identity register (8) checks the equipment identity (IMEI) of the terminal. Via the interface Nc (57) the MSC Server (5) of the public mobile phone system sees the multi-radio protocol gateway (4) and the IP telephony system (101) behind it as a mobile services switching center (MSC) of a public mobile phone system when during the transfer of an ongoing call from a MSC Server (5) to a IP telephony system (101) a circuit for the call is set up between the MSC Server (5) and the multi-radio protocol gateway (4). The interfaces (53), (54), (55), (56) and (57) can also be distributed by utilizing the 'SS7 over IP' gateway technique.

Via the interface S1 (58) of FIG. 1 the IP telephony system (101) sees the multi-radio protocol gateway (4) as a gateway between a conventional phone network (PSTN) center and the IP telephony system (101). Via the interface Mc (60) the media gateway (15) sees the multi-radio protocol gateway (4) as a media gateway controller. The interface S2 (59) is the connection interface of the subscriber data pool (24) of the IP telephony system (101), which can be implemented, for example, as a directory service using the LDAP protocol (Lightweight Directory Access Protocol) specified by IETF. The subscriber data in the subscriber data pool comprises the service profiles of the users, i.e. what basic and supplementary services the user has, which supplementary services are in use, etc. Even though in this example the subscriber data pool is described as a directory service using the LDAP protocol, the overall system utilizing the disclosed embodiments is in no way restricted only to LDAP protocol or directory service. The directory service using the LDAP protocol is used as an example, because it is a well known implementation. The directory service itself is similar to a database, but comprises more descriptive, attribute-based data. The directory service can be produced in various ways. The different methods make it possible to store different data in the directory and set different requirements for how the data is referred to, how the data is searched and updated, how the data is protected from unauthorized use, etc. The directory service can be local limiting to a certain context or it may be broader, even global, in which case the context can also be broader. A global directory service is typically implemented in a distributed manner, which in practice means that data is distributed to several servers, which together form a uniform (linked) and seamless directory service irrespective of where the actual data is physically located.

Figure 2:
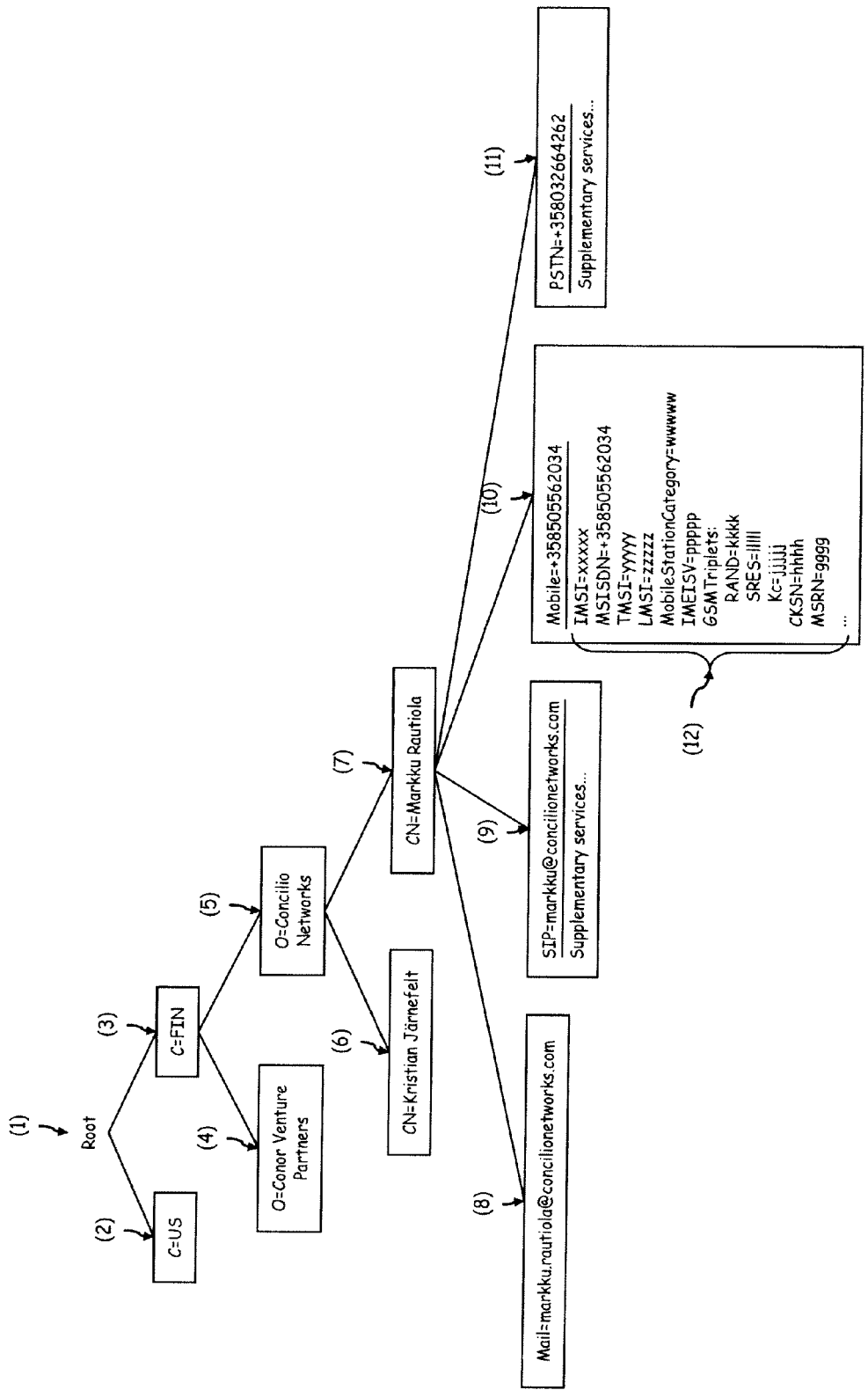
FIG. 2 shows an example of the directory tree structure of a directory service using an LDAP protocol.

FIG. 2 shows an example of an LDAP index tree structure. The LDAP protocol is based on a directory information tree, which is formed of an entity of one or more servers and where the data is referred to as entries. The entries are names, one or more value of the entry, for example (2), (3) and (4), (5) and (6), (7) and (8), (9), (10), (11) in FIG. 2, form a relative distinguished name (RDN) of the entry, which must be unique in comparison with all sibling names. The chain of relative distinguished names from the first relative distinguished name, for example (3), of the nameless root (1) to the specified relative distinguished name, for example (7), of the tree structure, forms the distinguished name of the entry in question, which is unique in the tree structure in question, in this case for example in the following manner:

<CN=Markku Rautiola, O=Concilio Networks, OU=Admininstration, C=FIN>

The relative distinguished names may also comprise a set of attributes, for example (12), which in turn comprise one or more value of the same type, which may be a mathematical value, a character string, or the like. All the attributes of one relative distinguished name are always located in one server. The relative distinguished names themselves are arranged in a tree structure, which reflects political, geographical or organizational boundaries. The relative distinguished names representing a country, for example (2) and (3), are topmost in the tree structure, below them are the relative distinguished names, for example, (4) and (5), which represent states or national organizations, below them can, in turn, be relative distinguished names, for example (6) and (7), which represent people, organization units, printers, documents, etc. A specified value of a relative distinguished name is referred to by a distinguished name that is therefore a combination of the relative distinguished name and the preceding relative distinguished names in the directory tree structure, for example in the following manner:

<IMSI=xxxxx, Mobile=+358505562034, CN=Markku Rautiola, O=Concilio Networks, C=FIN>

The LDAP protocol specifies the method for searching, browsing, adding, removing, amending, etc. the directory data, as well as the methods for reorganizing the linkings of directory servers. The LDAP directory service is based on a client-server-model, where one or more LDAP servers forms the actual directory service. The client can contact any LDAP server when searching for data with a distinguished name, the view of the directory service is always the same irrespective of which LDAP server the client contacts.

Via the interface S3 (61) of FIG. 1 the telephony service (26) of the IP telephony system (101) sees the subscriber data pool (24) of the IP telephony system (101) and the multi-radio protocol gateway (4) as a LDAP directory service in such a manner that when the multi-radio protocol gateway (4) has linked, for example, a relative distinguished name (10) according to FIG. 2 to the LDAP directory service, together with its attributes (12), i.e. the basic, additional, etc. services connected to the user's mobile phone number, the subscriber data can be used by the telephony service (26) of the IP telephony system (101) via the interface S3 (61).

The multi-radio protocol gateway (4) according to the disclosed embodiments comprises the following functions. A UNC GW function (18) comprises an UMA radio resource protocol gateway, via which the terminal (6) equipped with UMA properties registers and communicates with the multi-radio protocol gateway (4) and through that with the IP telephony system (101). The multi-radio protocol gateway (4)

does not implement the actual UMA network controller, but therefore only the UMA radio resource protocol gateway. A VLR GW-function (19) of the multi-radio protocol gateway of FIG. 1 comprises a visitor location register protocol gateway expanded with the control of address-of-records of the telephony network domain (101) and the address bindings connected to connection sessions. A DIR function (21) comprises a subscriber data pool, by means of which the multi-radio protocol gateway (4) can function by itself as a directory service or it can function as a part of a directory server set to produce the actual directory service. The functions of the visitor location register according to the public mobile phone system are implemented as a combination of a multi-radio protocol gateway (4), VLR GW (19), SGW (22) and DIR (21) functions, as well as the subscriber data pool (24) of the IP telephony system (101). A SIP GW function (20) comprises a SIP gateway, which implements the SIP user agent functions according to the SIP specifications of IETF. It is to be noted that the SIP GW function (20) can also implement the functions of a proprietary client, such as a Skype client. The functions and services of the mobile services switching center of the public mobile phone system are now implemented as a combination of a multi-radio protocol gateway (4), SIP GW (20) and SGW (22) functions, as well as the telephony service (26) of the IP telephony system (101). A SGW function (22) is the core of the protocol routing function of the multi-radio protocol gateway (4). The SGW function (22) receives and relays further the location updating, registering, identification, connection, disconnection etc. requests and responses coming from and going to different interfaces.

In the following, the function of the multi-radio protocol gateway in connection with the location updating and registering of the core network formed by the multi-radio protocol gateway (4) and the IP telephony system (101) will be described more in detail. The description of the function is based on functions according to 3 GPP for the part of the public mobile phone system and to functions according to IETF specifications for the part of the IP telephony system, functions differing from the functions according to the standards will be noted separately.

When the SGW function (22) shown in FIG. 1 receives a location updating request from the terminal (6) via the interface A (50), IuCS (71), Up (52) or U (70), it relays the request further to the VLR GW function (19). The VLR GW function (19) signals the location updating with the MSC Server (5) and the home location register (7). In connection with the location updating, the identifications of the user and the terminal are performed, which the VLR GW function (19) signals via the SGW function (22) between the terminal (6) and the home location (7) and equipment identity register (8) of the mobile phone system. In connection with the location updating the home location register (7) of the public mobile phone system relays to the VLR GW function (19) the subscriber data connected to the circuit-switched services etc. of the public mobile phone system, which the VLR GW function (19) saves in its database (or a corresponding memory). When the home location register (7) has accepted the location updating and the VLR GW function (19) has relayed the acceptance to the SGW function (22), the SGW function activates the SIP GW function (20) to perform the registration according to the SIP session procedure of the IETF to the IP telephony system (101) via the interface S1 (58). The SIP GW function (20) sets the home network registrar's domain name to the Request URI (Uniform Resource Identifier) of the SIP registration request, which domain name the SIP GW function (20) can derive from the user's International Mobile Subscriber Identity (IMSI) from its country and network codes according to the 3GPP specifications, if the SIP GW function (20) does not have the home network registrar's domain name, for example, in its configuration data. In the To header field of the SIP registration request the SIP GW function (20) sets the registration address, which is the public user identity of the registering user presented in the form of a uniform resource locator (URL) meant for a phone number, which in this case is the international mobile phone number (mobile station ISDN, MSISDN) of the above-mentioned registering user. In the From header field of the SIP registration request the SIP GW function (20) sets the address connection connected to the SIP session services of the user's SIP end point, which address connection follows the resource identifier structure according to the SIP session procedure, including the user's international mobile phone number as a character string+':' character+'MSISDN' character string+'@' character+domain name of the multi-radio protocol gateway (4) or its numeric IP address. In the Contact header field of the SIP registration request the SIP GW function (20) relays to the IP telephony system (101) the address connection connected to the SIP session services of the user's SIP end point, which address connection the SIP GW function (20) also relays to the VLR GW function (19) to be stored in a database (or a corresponding memory). The VLR GW function (19) relays the address connection via the SGW function (22) further to the DIR function (21), which saves it in its subscriber data pool. The above-mentioned address connection of the session services of the SIP end point now specifies the location of the terminal (6) in the IP telephony system (101) and is the same as the address connection relayed in the From header field, i.e. the user's international mobile phone number as a character string+':' character+'MSISDN' character string+'@' character+domain name of the multi-radio protocol gateway (4) or its numeric IP address. The 'MSISDN' character string indicates that the registration is performed by the multi-radio protocol gateway according to the present invention. In addition, the user's international mobile phone number as a character string+':'+'MSISDN' character string now form a fully unambiguous identifier of the user in the multi-service network (102). The 'MSISDN' character string is relayed in the password field of the userinfo of the resource identifier of the SIP session procedure. After a successful SIP registration the SIP GW function (20) relays information on it to the VLR GW function (19), which sends the subscriber data received and saved from the home location register (7) of the public mobile phone system to the DIR function (21) after receiving information on a successful SIP registration. The DIR function (21) in turn saves the subscriber data into its subscriber data pool in the form the data was received from the home location register (7) of the public mobile phone system and links the multi-radio protocol gateway (4) to the subscriber data pool (24) of the IP telephony system (101) for the part of the subscriber data of the user identified in the acceptance response, in which case the subscriber data is visible, for example, in the directory service formed by the subscriber data pool (24), for example as attributes (12) according to FIG. 2. This requires that the DIR function (21) has the necessary information on the servers to be linked, for example, in its configuration data. After relaying information on a successful SIP registration to the VLR GW function (19) the SIP GW function (20) sends a location updating response indicating acceptance to the SGW function (22), which relays it to the terminal (6). If the SIP registration fails for some reason, the SIP GW function (20) activates the cancellation of location updating to the home location register (7) of the mobile phone system in accordance with the 3 GPP specifications. The cancellation of location updating is performed by the VLR GW function (19) and the SGW function (22) signals it between the terminal (6) and the VLR GW function (19). The VLR GW function (19) also informs the DIR function (21) on the cancellation of the location updating, in which case the DIR function (21) removes the previously saved address connection from its subscriber data pool. In the terminal (6) the cancellation of the location updating shows as a rejection of the original location updating request. The home location register (7) can also reject the original location updating request, which rejection is signaled by the SGW function (22) to the terminal (6) after receiving it from the VLR GW function (19).

When the terminal (6) shown in FIG. 1 moves away form the range of operation of the multi-radio protocol gateway (4) and thus performs a location updating to a public mobile phone system, the home location register (7) of the public mobile phone system performs the cancellation of location updating with the VLR GW function (19) of the multi-radio protocol gateway via the interface D (55). When the VLR GW function (19) receives the location updating cancellation request, it removes the subscriber data of the user identified in the cancellation request from its database (or corresponding memory), after which the VLR GW function (19) relays the location updating request to the DIR function (21) and the SIP GW function (20). After receiving the location updating cancellation request the DIR function (21) removes the multi-radio protocol gateway (4) linking to the data pool (24) of the IP telephony system (101) for the part of the subscriber data of the user identified in the cancellation request, in which case the subscriber data of the user in question are no longer visible, for example, in the directory service formed by the subscriber data pool (24). When the SIP GW function (20) receives the location updating cancellation request, it in turn performs updating the registration in the IP telephony system (101) via the interface S (58) by using the SIP registration procedure. In this case the SIP GW function (20) removes the address connection connected to the session services of the SIP end point addressing the multi-radio protocol gateway (4) by sending an SIP registration request to the IP telephony system (101), whose expiration time is 0 seconds and whose Contact header field has the above-mentioned address connection connected to the session services. The IP telephony system (101) lists its remaining address connections in the Contact header field of its acceptance response. If the Contact header field is empty or missing completely from the response, this indicates to the SIP GW function (20) that other address connections do not exist, in which case the SIP GW function (20) sends a new SIP registration request to the IP telephony system (101), whose Contact header field now has an address connection addressing the SS7 gateway (23) as an address connection connected to the session service of the SIP end point. The SIP GW function (20) relays the address connection data to the VLR GW functions (19) after receiving the acceptance response from the IP telephony system (101), after which the VLR GW function (19) relays the address connection further to the DIR function (21), which in turn updates the data to its subscriber data pool and links the multi-radio protocol gateway (4) to the subscriber data pool (24) of the IP telephony system (101) for the part of the subscriber data of the user identified in the acceptance response. If the Contact header field of the acceptance response of the IP telephony system (101) now also comprises other address connections than the above-mentioned registered address connection, whose user data password field has an 'MSISDN' character string, the above-mentioned registered address connection addressing the SS7 gateway is removed, because in this case some other multi-radio protocol gateway has registered the terminal (6) to the IP telephony system (101).

In the following, the functions connected to phone call establishing/cancellation are described more in detail.

When the SGW function (22) of the multi-radio protocol gateway receives a phone call establishing request from the terminal (6) via the interface A (50), IuCS (71) or Up (52), it relays the request further to the SIP GW function (20). The SIP GW function (20) in turn forms the SIP session request (INVITE) to be sent to the IP telephony system (101). To the request URI of the SIP session request the SIP GW function (20) sets the phone number of the user to be reached in the form of an URL meant for telephone numbers. In the To header field the SIP GW function (20) sets the phone number of the user to be reached and to the From header filed the caller's phone number in the form of an URL meant for telephone numbers. The phone numbers of the user to be reached and the caller are received from the phone call establishing request from the terminal (6). In the Contact header field the SIP GW function (20) sets the address connection connected to the session services of the caller's SIP end point, to which address the SIP requests and request responses meant for the caller are to be sent and which follows the resource identifier structure according to the SIP session procedure, including the user's international mobile phone number as a character string+':' character+'MSISDN' character string+'@' character+domain name of the multi-radio protocol gateway (4) or its numeric IP address. The session request also includes the message body for session media description. The media is described with a set of parameters, which specify, inter alia, the network type, the domain name of the caller's SIP end point, the domain name of the used media gateway, the media type, the media relay protocol, and the media coding method. The domain name of the caller's SIP end point is the domain name of the multi-radio protocol gateway (4) in question. The domain name of the media gateway (15) being used is received form the system configuration data. The media coding method is, in turn, received from the phone call establishing request received from the terminal (6). The SIP GW function (20) sends the SIP session request to the IP telephony system (101) via the interface S1 (58), after which the IP telephony system (101) forms an SIP session, which is signaled between the IP telephony system (101) and the terminal (6) via the SIP GW (20) and SGW (22) functions of the multi-radio protocol gateway (4). If the IP telephony system (101) responds to the SIP session request with a 'Not Found' response or the like, the SIP GW function (20) performs the registration of a third party to the IP telephony system (101) via the interface S1 (58). In the To header field of the SIP registration request the SIP GW function (20) now sets the phone number of the user to be reached in the form of an URL meant for telephone numbers and to the From header filed the caller's registration address. In the Contact header field of the SIP registration request the SIP GW function (20) sets the address connection connected to the session services of the user's SIP end point, which is formed of the phone number of the user to be reached as a character string+ ':' character+'MSISDN' character string+'@' character+domain name of the SS7 gateway (23) or its numeric IP address. The registration is performed as presented above in the paragraphs describing the operation of the multi-radio protocol gateway (4) in connection with the location updating and registering of the core network formed by the multi-radio protocol gateway (4) and the IP telephony system (101). After a successful registration, the SIP GW function (20) re-forms the same SIP session request as above and sends it to the IP telephony system (101), after which the IP telephony system (101) forms an SIP session, which is signaled between the IP telephony system (101) and the terminal (6) via the SIP GW (20) and SGW (22) functions of the multi-radio protocol gateway (4). Cancellation of the connection takes place in a corresponding manner by signaling it between the IP telephony system (101) and the terminal (6) via the SIP GW (20) and SGW (22) functions of the multi-radio protocol gateway (4).

The phone call can also be formed from the IP telephony system (101) to the terminal (6).

When the SIP GW function (20) of the multi-radio protocol gateway (4) receives an SIP session request from the IP telephony system (101), it converts the SIP session request into a circuit-switched phone call establishing request and relays the phone call establishing request further to the SGW function 822). The SIP GW function (20) searches the location and identification data of the terminal from the DIR GW function (21) on the basis of the phone number of the user being reached in the request URI of the SIP session request. The phone numbers of the user to be reached and the caller, which are necessary in the phone call establishing request sent to the SGW function (22), the SIP GW function (20) now receives from the registration addresses of the To and From header fields of the SIP session request, which addresses are shown in the form of an URL meant for telephone numbers. The SIP GW function (20) receives the phone number of the user to be reached from the request resource identifier as well. The phone call establishing request must also include the coding method of the media being used, which is received from the description message body of the media of the session request. After receiving the phone call establishing request the SGW function (22) first performs a paging procedure, with which the terminal (6) is made to receive a phone call establishing request, if the connection between the terminal (6) and the multi-radio protocol gateway (4) is not already active. When the terminal (6) has answered the page, the SGW function (22) relays the phone call establishing request to the terminal (6), in which case the phone call establishing is signaled between the terminal (6) and the IP telephony system (1010) via the SGW (22) and SIP GW (20) functions of the multi-radio protocol gateway (4). In the first session request response, where the description message body of media is allowed, the SIP GW function (20) relays, in addition to the relay protocol and coding method of the media being used, the domain name of the SIP end point of the user to be reached, as well as the domain name of the media gateway (15) being used. The domain name of the SIP end point of the user to be reached is the domain name of the multi-radio protocol gateway (4) in question. The domain name of the media gateway (15) being used is received from the system configuration data. If no response is received from the terminal (6) to the above-described paging procedure and if the response to the paging procedure is repeatedly missing, the SGW relays information on this to the SIP GW function (20), which responds to the SIP session request with a 'Not Found' response or the like and performs the registration of a third party to the IP telephony system (101) via the interface S1 (58). In the To header field of the SIP registration request the SIP GW function (20) now sets the phone number of the user to be reached in the form of an URL meant for telephone numbers and in the From header filed the caller's registration address. In the Contact header field of the SIP registration request the SIP GW function (20) sets the address connection connected to the session services of the SIP end point of the user to be reached, which is formed of the phone number of the user to be reached now as a character string+':' character+ 'MSISDN' character string+'@' character+domain name of the SS7 gateway (23) or its numeric IP address. The registration is performed as presented above in the paragraphs describing the function of the multi-radio protocol gateway (4) in connection with the location updating and registration of the core network formed by the multi-radio protocol gateway (4) and the IP telephony system (101).

In the following handover between two different multi-radio protocol gateways (4), as well as between a multi-radio protocol gateway (4) and a MSC Server (5) of a public mobile phone system is described hereinbelow.

The base station/radio network controller (2) of the wireless access network (104) of a public mobile phone system requests handover from the multi-radio protocol gateway (4) by sending a handover request to it via the interface A (50) or IuCS (71). The handover request includes, inter alia, a list of radio cells, which the base station/radio network controller (2) has selected as suitable targets on the basis of the measuring data received from the terminal (6). After receiving the handover request the SGW function (22) of the multi-radio protocol gateway (4) selects a new radio cell, to which it directs the terminal (6). The new radio cell is selected in the following order:

A new radio cell is selected from the area of the same multi-radio protocol gateway (4), if the radio cell list sent by the base station/radio network controller (2) contains one and if the base station/radio network controller in question has free resources for forming a connection A new radio cell is selected from the area of such a multi-radio protocol gateway, which belongs to the same domain as the multi-radio protocol gateway (4) in question A new radio cell is selected from the area of a multi-radio protocol gateway of some other domain area A new radio cell is selected from a public mobile phone system The SGW function (22) of the multi-radio protocol gateway (4) sends the handover request to the new target multi-radio protocol gateway (which can be the same multi-radio protocol gateway (4)) over a TCP/IP (or the like) connection. In the handover request the SGW function (22) relays the address connection of the second SIP end point of the phone call in question, as well as the audio relay protocol and coding method in use, the network type, the domain name of the second SIP end point of the phone call in question, as well as the domain name of the media gateway of the second SIP end point of the phone call in question. The SGW function (22) receives this data from the SIP GW function (20). After receiving the handover request the SGW function of the target multi-radio protocol gateway relays the address connection of the second SIP end point of the phone call in question as well as the data connected to media transfer to the SIP GW function and directs a corresponding handover request further to the target base station/radio network controller of the wireless access network (104) of the public mobile phone system addressed by the selected radio cell. If the target base station/radio network controller has resources for forming a connection, it sends a handover request response indicating acceptance of the handover request back to the SGW function of the target multi-radio protocol gateway, which in turn directs it to the SGW function (22) of the multi-radio protocol gateway (4). After receiving the handover request response the SGW function (22) of the multi-radio protocol gateway (4) sends a handover command to the base station/radio network controller (2), which relays the command further to the terminal (6). After receiving the handover command the terminal (6) transfers to the area of the new radio cell and notifies that to the target base station/radio network controller, which in turn notifies the transfer to the target multi-radio protocol gateway. The SGW function of the target multi-radio protocol gateway notifies the transfer of the terminal (6) to the SGW function (22) of the multi-radio protocol gateway (4). When the terminal (6) communicates successfully through the new radio cell, the target base station/radio network controller notifies this to the target multi-radio protocol gateway with a handover completion response. The SGW function of the target multi-radio protocol gateway relays the handover completion response to the SGW function (22) of the multi-radio protocol gateway (4), which requests the base station/radio network controller (2) to release the allocated resources after receiving the handover completion response. The handover between two different multi-radio protocol gateways (4) has succeeded. It is to be noted that in this case the phone call signaling connection between the terminal (6) and the IP telephony system (101) travels via the old and new multi-radio protocol gateways (4). In the case that the phone call signaling connection is transferred entirely to the new target multi-radio protocol gateway, after receiving the handover notification of the terminal (6) the SGW function (22) of the (old) multi-radio protocol gateway (4) requests the transfer of the phone call from the SIP GW function (20), which creates a SIP session transfer request (REFER) and sends it to the second SIP end point of the phone call in question in order to indicate the transfer of the phone call to a new SIP end point. In the To header field of the transfer request the SIP GW function (20) sets the address connection of the second SIP end point of the phone call in question and in the From header field the address connection of the old SIP end point of the transferring user, which is therefore now the user's phone number as a character string+':' character+'MSISDN' character string+'@' character+domain name of the multi-radio protocol gateway (4) or its numeric IP address. In the Refer-To header field of the SIP session refer request the SIP GW function (20) sets the new SIP end point of the transferring user as the address connection as a character string of handover phone number+':' character+'MSISDN' character string+'@' character+domain name of the target multi-radio protocol gateway or its numeric IP address, as well as SIP session request as the connection formation method. The above-mentioned handover phone number is a standard phone number configured to each multi-radio protocol gateway, which is registered in the IP telephony system (101). After receiving the phone call transfer request the second SIP end point of the phone call in question forms an SIP session request and sends it to the target multi-radio protocol gateway. The SIP GW function of the target multi-radio protocol gateway receives the session request, the media relay protocol and coding method used in the description message body of the media of the session request, the network type, the domain name of the second SIP end point of the phone call in question, as well as the domain name of the media gateway of the second SIP end point of the phone call in question. If the description message body of the media is missing, the SIP GW function of the target multi-radio protocol gateway uses the corresponding data received in the handover request from the (old) multi-radio protocol gateway. The SIP GW function of the target multi-radio protocol gateway responds to the SIP session request with a Session Progress response, which includes the media relay protocol and coding method used in the description message body of media, the network type, the domain name of the target multi-radio protocol gateway, as well as the domain name of the media gateway allocated by the target multi-radio protocol gateway. The progress of the SIP session is notified to the SIP GW function (20) of the multi-radio protocol gateway (4) with an SIP notification response (NOTIFY). When the terminal (6) communicates successfully via a new radio cell, the SGW function of the target multi-radio protocol gateway notifies this to the SIP GW function, which creates a SIP session acceptance response and sends it to the second SIP end point of the phone call in question, which, in turn, notifies the formation of the SIP session to the SIP GW function (20) of the multi-radio protocol gateway (4), which in turn can exit the SIP session. The signaling connection of the phone call has now been transferred entirely to a new target multi-radio protocol gateway.

The terminal (6) may perform the handover to a public mobile phone system as well. In this case the SGW function (22) of the multi-radio protocol gateway (4) sends a handover request to the MSC Server (5) of a public mobile phone system via the interface E (53). When the MSC Server (5) of the public mobile phone system has performed the necessary procedures for performing the handover, it sends a handover request response to the multi-radio protocol gateway (4). After receiving the handover request response, the SGW function (22) of the multi-radio protocol gateway (4) sends a circuit set-up request to the MSC Server (5) of the public mobile phone system via the interface Nc (57), if no circuit is in use. The MSC Server (5) acknowledges the circuit set-up, after which the SGW function (22) of the multi-radio protocol gateway (4) sends a handover command to a base station/radio network controller (2), which relays the command further to the terminal (6). After receiving the handover command the terminal (6) transfers to the area of the new radio cell and notifies that to the MSC Server (5) of the public mobile phone system, which in turn notifies the transfer to the SGW function (22) of the target multi-radio protocol gateway (4). When the terminal (6) communicates successfully through the new radio cell, the MSC Server (5) of the public mobile phone system notifies this to the SGW function (22) of the multi-radio protocol gateway (4) with a handover completion response. The handover from the IP telephony system (101) to the public mobile phone system has succeeded. It is to be noted that in this case the phone call signaling connection between the terminal (6) and the public mobile phone system travels via the multi-radio protocol gateway (4).

The handover can be requested also by the MSC Server (5) of a public mobile phone system. The MSC Server (5) sends a handover request to the multi-radio protocol gateway (4) via the interface E (53). After receiving the handover request, the SGW function (22) of the multi-radio protocol gateway (4) sends a corresponding request to the target base station/radio network controller (2) of the wireless access network (104) of the public mobile phone system addressed by the selected radio cell. If the base station/radio network controller (2) has resources for forming a connection, it sends a handover request response indicating acceptance of the handover request back to the SGW function (22) of the multi-radio protocol gateway (4), which in turn sends a corresponding handover request response to the MSC Server (5) of the public mobile phone system. After receiving the handover request response, the MSC Server (5) of the public mobile phone system sends a circuit set-up request to the multi-radio protocol gateway (4) via the interface Nc (57), if no circuit is in use. The SGW function (22) of the multi-radio protocol gateway (4) acknowledges the setup of a circuit, after which the MSC Server (5) of the public mobile phone system initiates the handover. After receiving the handover command the terminal (6) transfers to the area of the new radio cell and notifies that to the base station/radio network controller (2) of the public mobile phone system, which in turn notifies the transfer to the multi-radio protocol gateway (4). The SGW function (22) of the multi-radio protocol gateway (4) notifies the transfer of the terminal (6) to the MSC Server (5) of the public mobile phone system. When the terminal (6) communicates successfully through the new radio cell, the base station/radio network controller (2) notifies this to the multi-radio protocol gateway (4) with a handover completion response. The multi-radio protocol gateway (4) sends a corresponding handover completion response to the MSC Server (5) of the public mobile phone system. The handover from the public mobile phone system to the IP telephony system (101) has succeeded. It is to be noted that in this case the phone call signaling and voice connection to the terminal (6) travels via the MSC Server (5) of the public mobile phone system.

The invention claimed is:

1. A method for registering a terminal in a multiservice network, the method comprising:
   responsive to receiving a location updating request, specifying, by a processor-based multi-radio network gateway a location of the terminal in the multi-service network by an address including one of the following combinations (i) and (ii);
   (i) a unique identifier of a user and either a domain name of the multi-radio protocol gateway or a unique numeric IP address of the multi-radio protocol gateway, and
   (ii) a unique identifier of the user and either a domain name of an SS7 gateway or a unique numeric IP address of the SS7 gateway;
   registering said address combination, upon receiving in the multi-radio protocol gateway, either a response indicating failure of a registration request from the multi-service network, or a cancellation of the location updating request from a home location register, and upon said multi-radio protocol gateway further receiving (a) said user's unique identifier, (b) either a domain name of the multi-radio protocol gateway or a unique numeric IP address of a multi-radio protocol gateway, and (c) either the domain name of the SS7 gateway or the numeric IP address of the SS7 gateway; and
   cancelling the registering of the address combination indicating the SS7 gateway, if an acceptance response of the registration request addressing said SS7 gateway received by the multi-radio protocol gateway also includes said address combination (i), other than said address combination indicating the SS7 gateway, and if said user's unique identifier in any of said address combinations (i) and (ii) includes either a domain name of the multi-radio protocol gateway or a unique numeric IP address of a multi-radio protocol gateway.

2. The method according to claim 1, wherein said registering of the terminal is a synchronized combination of a location updating procedure of a circuit-switched part of a mobile core network and a registration procedure of the multi-service network.

3. The method according to claim 2, the method further comprising:
   completing the registration procedure of the multi service network before an acceptance message or a refusal message of the location updating procedure of the circuit-switched part of the mobile core network is sent to the terminal.

4. The method according to claim 1, the method further comprising:
   setting said address combination, upon the terminal being located in an area of the multi-service network, as a unique domain name formed by said user's phone number, a multi-radio-protocol-gateway-specific identifier, and the domain name of the multi-radio protocol gateway or the numeric IP address of the multi-radio protocol gateway.

5. The method according to claim 1, the method further comprising:
   setting said address combination, upon the terminal being located in an area of a public mobile phone system, as a unique domain name formed by said user's phone number, a multi-radio-protocol-gateway-specific identifier, and the domain name of the SS7 gateway or the numeric IP address of the SS7 gateway.

6. The method according to claim 1, wherein the multi-radio protocol gateway and a subscriber data pool of a mobile core network together form a uniform and combined subscriber data pool.

7. The method according to claim 6, wherein the multi-radio protocol gateway is connected to the subscriber data pool of the multi-service network on terminal-specific basis.

8. A system for registering a terminal to a multi-service network, the system comprising:
   a wireless access network, which is a radio network of a public mobile phone system or a radio network utilizing unlicensed frequencies,
   a multi-radio protocol gateway, which comprises:
   means for registering the terminal to the multi-service network,
   wherein the multi-radio protocol gateway together with a subscriber data pool of the multi-service network implement a visitor location register of a public mobile core network, multi-radio protocol gateway further comprising:
   means, responsive to receiving a location updating for the terminal, for specifying a location of the terminal in the multi-service network with an address including one of the following combinations (i) and (ii):
   (i) a unique identifier of a user of the terminal and either a domain name of the multi-radio protocol gateway or a unique numeric IP address of the multi-radio protocol gateway, and
   (ii) a unique identifier of the user and either a domain name of a SS7 gateway or a unique numeric IP address of the SS7 gateway;
   wherein the multi-radio protocol gateway is configured for registering said address combination, upon receiving in the multi-radio protocol gateway, either a response indicating failure of a registration request from the multi-service network, or a cancellation of the location updating request from a home location register, and upon said multi-radio protocol gateway further receiving (a) said user's unique identifier, (b) either a domain name of the multi-radio protocol gateway or a unique numeric IP address of a multi-radio protocol gateway, and (c) either the domain name of the SS7 gateway or the numeric IP address of the SS7 gateway; and
   wherein the multi-radio protocol gateway is configured for cancelling the registering of the address combination indicating the SS7 gateway, if an acceptance response of the registration request addressing said SS7 gateway received by the multi-radio protocol gateway also includes said address combination (i), other than said address combination indicating the SS7 gateway, and if said user's unique identifier in any of said address combinations includes either a domain name of the multi-radio protocol gateway or a unique numeric IP address of a multi-radio protocol gateway.

9. The system according to claim 8, wherein the multi-radio protocol gateway together with a telephony service of the multi-service network implements a mobile services switching center of the public mobile core network, wherein a call establishing a packet-switched part of the public mobile core network is connected to a registration procedure and a connection formation procedure of the multi-service network.

10. The system according to claim 9, wherein the multi-radio protocol gateway is arranged to complete the registration procedure of the multi-service network before the acceptance or refusal message of a location updating procedure of a circuit-switched part of the public mobile core network is sent to the terminal.

11. The system according to claim 8, wherein the multi-radio protocol gateway is arranged to set said address combination, upon the terminal being located in an area of the multi-service network, as a unique domain name formed by said user's phone number, a multi-radio-protocol-gateway-specific identifier, and the domain name of the multi-radio protocol gateway or the numeric IP address of the multi-radio protocol gateway.

12. The system according to claim 8, wherein the multi-radio protocol gateway is arranged to set said address combination, upon the terminal being located in an area of the public mobile phone system, as a unique domain name formed by said user's phone number, a multi-radio-protocol-gateway-specific identifier, and the domain name of the SS7 gateway or the numeric IP address of the SS7 gateway.

13. A multi-radio protocol gateway arranged to interface at least one wireless access network and a multi-service network, wherein the multi-radio protocol gateway together with a subscriber data pool of the multi-service network implements a visitor location register of a public mobile core network, the multi-radio protocol gateway comprising:
    means for registering a terminal connected to said at least one wireless access network to the multi-service network, and
    means, responsive to receiving a location updating request for the terminal, for specifying a location of the terminal in the multi-service network with an address including one of the following combinations (i) and (ii):
    (i) a unique identifier of a user and either a domain name of the multi-radio protocol gateway or a unique numeric IP address of a multi-radio protocol gateway, and
    (ii) a unique identifier of a user and either a domain name of a SS7 gateway or a unique numeric IP address of the SS7 gateway;
    wherein the multi-radio protocol gateway is configured for registering said address combination, upon receiving in the multi-radio protocol gateway, either a response indicating failure of a registration request from the multi-service network, or a cancellation of the location updating request from a home location register, and upon said multi-radio protocol gateway further receiving (a) said user's unique identifier, (b) either a domain name of the multi-radio protocol gateway or a unique numeric IP address of a multi-radio protocol gateway, and (c) either the domain name of the SS7 gateway or the numeric IP address of the SS7 gateway; and
    wherein the multi-radio protocol gateway is configured for cancelling the registering of the address combination indicating the SS7 gateway, if an acceptance response of the registration request addressing said SS7 gateway received by the multi-radio protocol gateway also includes said address combination (i), other than said address combination indicating the SS7 gateway, and if said user's unique identifier in any of said address combinations includes either a domain name of the multi-radio protocol gateway or a unique numeric IP address of a multi-radio protocol gateway.

14. The multi-radio protocol gateway according to claim 13, wherein the multi-radio protocol gateway together with a telephony service of the multi-service network implements a mobile services switching center of the public mobile core network, wherein a call establishing a packet-switched part of the public mobile core network is connected to a registration procedure and a connection formation procedure of the multi-service network.

15. The multi-radio protocol gateway according to claim 14, wherein the multi-radio protocol gateway is arranged to complete the registration procedure of the multi-service network before the acceptance or refusal message of a location updating procedure of a circuit-switched part of the public mobile core network is sent to the terminal.

16. The multi-radio protocol gateway according to claim 14, wherein the multi-radio protocol gateway is arranged to set said address combination, upon the terminal being located in an area of the multi-service network, as a unique domain name formed by said user's phone number, a multi-radio-protocol-gateway-specific identifier, and the domain name of the multi-radio protocol gateway or the numeric IP address of the multi-radio protocol gateway.

17. The multi-radio protocol gateway according to claim 14, wherein the multi-radio protocol gateway is arranged to set said address combination, upon the terminal being located in an area of the public mobile phone system, as a unique domain name formed by said user's phone number, a multi-radio-protocol-gateway-specific identifier, and the domain name of the SS7 gateway or the numeric IP address of the SS7 gateway.

* * * * *